US010914677B2

(12) United States Patent
Gold et al.

(10) Patent No.: US 10,914,677 B2
(45) Date of Patent: Feb. 9, 2021

(54) SYSTEM AND METHOD FOR CALIBRATING A MELT POOL MONITORING SYSTEM OF AN ADDITIVE MANUFACTURING MACHINE

(71) Applicant: General Electric Company, Schenectady, NY (US)

(72) Inventors: Scott Alan Gold, Waynesville, OH (US); Thomas Graham Spears, Springdale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/960,705

(22) Filed: Apr. 24, 2018

(65) Prior Publication Data

US 2019/0323951 A1 Oct. 24, 2019

(51) Int. Cl.
| | |
|---|---|
| *G01J 3/00* | (2006.01) |
| *G01N 21/27* | (2006.01) |
| *G01J 1/44* | (2006.01) |
| *G01J 5/10* | (2006.01) |
| *B33Y 30/00* | (2015.01) |
| *B23K 26/70* | (2014.01) |
| *B33Y 50/00* | (2015.01) |
| *G01J 5/00* | (2006.01) |

(52) U.S. Cl.
CPC ......... *G01N 21/274* (2013.01); *B23K 26/702* (2015.10); *B33Y 30/00* (2014.12); *B33Y 50/00* (2014.12); *G01J 1/44* (2013.01); *G01J 5/10* (2013.01); *G01J 2001/444* (2013.01); *G01J 2005/0048* (2013.01)

(58) Field of Classification Search
CPC ...... G01N 21/274; B33Y 50/00; B33Y 30/00; G01J 5/10; G01J 1/44; G01J 2001/444; G01J 2005/0048; B23K 26/702
See application file for complete search history.

(56) References Cited

U.S. PATENT DOCUMENTS

| | | |
|---|---|---|
| 4,286,868 A | 9/1981 | Laska |
| 6,553,275 B1 | 4/2003 | Mazumder |
| 6,580,959 B1 | 6/2003 | Mazumder |
| 7,623,230 B2 | 11/2009 | Porjo |
| 8,351,035 B2 | 1/2013 | Goohs et al. |
| 9,696,142 B2 | 7/2017 | Bamberg et al. |
| 9,702,248 B2 | 7/2017 | Chen et al. |
| 2007/0075460 A1 | 4/2007 | Wahlstrom et al. |
| 2013/0168902 A1 | 7/2013 | Herzog et al. |
| 2016/0303806 A1 | 10/2016 | Mercelis |

(Continued)

*Primary Examiner* — Abdullahi Nur
(74) *Attorney, Agent, or Firm* — Dinsmore & Shohl LLP

(57) ABSTRACT

A system and method for calibrating a melt pool monitoring system of an additive manufacturing machine includes installing a calibration system on the machine and performing a calibration process. Specifically, the calibration system includes a calibration platform removably mountable to a build platform of the additive manufacturing machine and having calibrated electromagnetic energy sources mounted thereon for defining a measurement standard. The electromagnetic energy generated is measured by the melt pool monitoring system and compared to the known measurement standard to determine whether system adjustments would improve process tolerances or uniformity.

19 Claims, 4 Drawing Sheets

(56) References Cited

U.S. PATENT DOCUMENTS

| | | |
|---|---|---|
| 2017/0173695 A1 | 6/2017 | Myerberg et al. |
| 2017/0203517 A1 | 7/2017 | Crear et al. |
| 2017/0310935 A1* | 10/2017 | Sinclair ................. B29C 64/245 |
| 2018/0136633 A1* | 5/2018 | Small ................... G06Q 20/065 |
| 2018/0185963 A1* | 7/2018 | Ostroverkhov ....... B29C 64/371 |
| 2019/0134748 A1* | 5/2019 | Roychowdhury ... B23K 26/342 |
| 2019/0248075 A1 | 8/2019 | Klaubner et al. |

* cited by examiner

SYSTEM AND METHOD FOR CALIBRATING A MELT POOL MONITORING SYSTEM OF AN ADDITIVE MANUFACTURING MACHINE

FIELD

The present disclosure generally relates to additive manufacturing machines, or more particularly, to a calibration system for an additive manufacturing machine.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and/or ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass, and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress relief process. Additionally, thermal, mechanical, and chemical post processing procedures can be used to finish the part.

In order to monitor the additive manufacturing process, certain conventional additive manufacturing machines include melt pool monitoring systems. These monitoring systems typically includes one or more cameras or light sensors for detecting light that is radiated or otherwise emitted from the melt pool generated by the energy beam. The camera or sensor values can be used to evaluate the quality of the build, during or after completion of the build process. The quality evaluation may be used to adjust the build process, stop the build process, troubleshoot build process anomalies, issue a warning to the machine operator, and/or identify suspect or poor quality parts resulting from the build. However, such melt pool monitoring systems are frequently not calibrated, making it impossible to determine if variations in camera or sensor signals are a product of variations in the additive build process or melt pool or are the product of variations in the melt pool monitoring system itself when comparing data from multiple machines. In practice, additive manufacturing has been primarily used for prototyping and small lot production with melt pool monitoring used as a research and development tool rather than part quality assessment. The recent emergence of mass production applications where build-to-build and machine-to-machine repeatability is far more critical has highlighted the value of melt pool monitoring as a quality tool.

Accordingly, an additive manufacturing machine with improved calibration features would be useful. More particularly, a system and method for calibrating a melt pool monitoring system of an additive manufacturing machine would be particularly beneficial.

BRIEF DESCRIPTION

Aspects and advantages will be set forth in part in the following description, or may be obvious from the description, or may be learned through practice of the invention.

According to one embodiment of the present subject matter, a method of calibrating a melt pool monitoring system of an additive manufacturing machine is provided. The method includes illuminating one or more electromagnetic energy sources at one or more fixed positions in the additive manufacturing machine and measuring electromagnetic energy emitted from the one or more electromagnetic energy sources using the melt pool monitoring system. The method further includes comparing the measured electromagnetic energy to a measurement standard and adjusting the melt pool monitoring system such that a signal associated with the measured electromagnetic energy is substantially identical to the measurement standard.

According to another exemplary embodiment, a calibration system for a melt pool monitoring system of an additive manufacturing machine is provided. The calibration system includes a light mounting mechanism positionable at desired locations within the additive manufacturing machine and one or more electromagnetic energy sources mounted to the light mounting mechanism, the one or more electromagnetic energy sources defining a measurement standard when illuminated.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
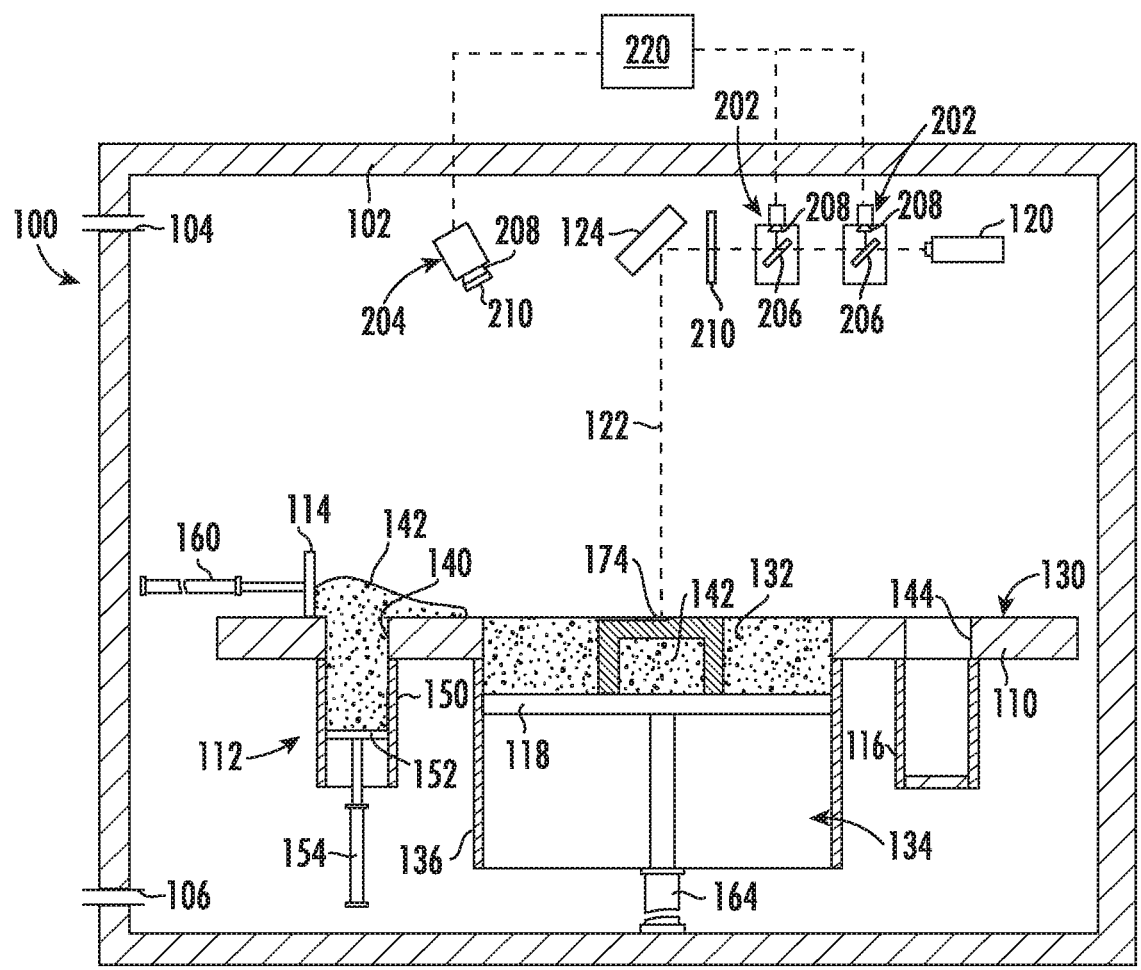
FIG. 1 shows a schematic view of an additive manufacturing machine according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

A system and method for calibrating a melt pool monitoring system of an additive manufacturing machine includes installing a calibration system on the machine and performing a calibration process. Specifically, the calibration system includes a calibration platform removably mountable to a build platform of the additive manufacturing machine and having calibrated electromagnetic energy sources mounted thereon for defining a measurement standard. The electromagnetic energy generated is measured by the melt pool monitoring system and compared to the known measurement standard to determine whether system adjustments would improve process tolerances or uniformity.

Referring to FIG. 1, a laser powder bed fusion system, such as a DMLS or DMLM system 100 will be described according to an exemplary embodiment. As illustrated, system 100 includes a fixed enclosure 102 which provides a contaminant-free and controlled environment for performing an additive manufacturing process. In this regard, for example, enclosure 102 serves to isolate and protect the other components of the system 10. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

Energy source 120 may include any known device operable to generate a beam of suitable power and other operating characteristics to melt and fuse the metallic powder during the build process. For example, energy source 120 may be a laser. Other directed-energy sources such as electron beam guns are suitable alternatives to a laser.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. It should be appreciated that other types of energy sources 120 may be used which may use and alternative beam steering apparatus 124. For example, if the energy source 120 is an electronic control unit for directing an electron beam, beam steering apparatus 124 may be, e.g. a deflecting coil.

Prior to an additive manufacturing process, supply actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts 170 being manufactured. As an example, the layer increment may be about 10 to 100 micrometers (0.0004 to 0.004 in.).

Figure 2:
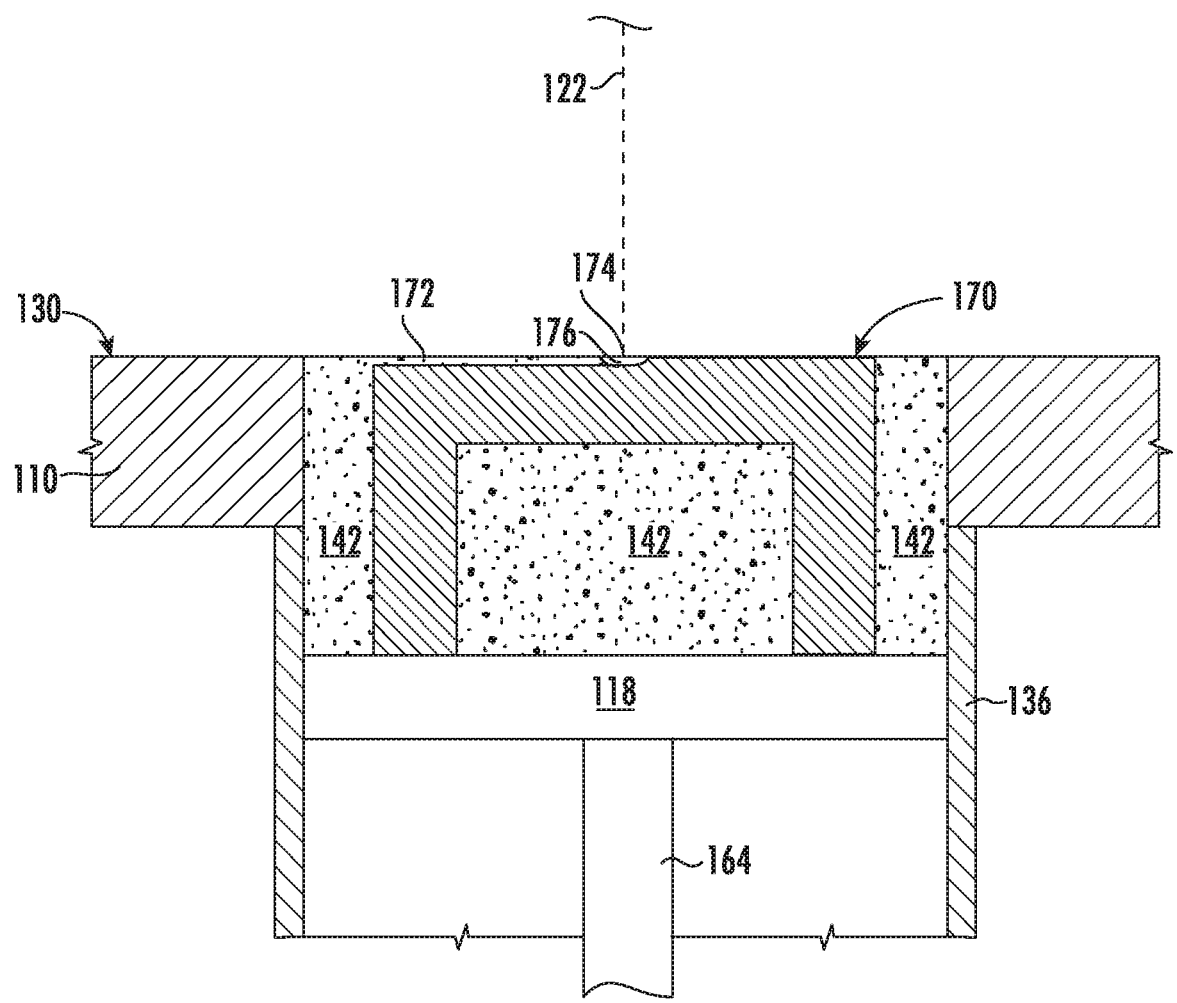
FIG. 2 shows a close-up schematic view of a build platform of the exemplary additive manufacturing machine of FIG. 1 according to an exemplary embodiment of the present subject matter.

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position. The leveled additive powder 142 may be referred to as a "build layer" 172 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components being built. This mass of powder is generally referred to as a "powder bed", and this specific category of additive manufacturing process may be referred to as a "powder bed process."

During the additive manufacturing process, the directed energy source 120 is used to melt a two-dimensional cross-section or layer of the component 170 being built. More specifically, energy beam 122 is emitted from energy source 120 and beam steering apparatus 26 is used to steer the focal spot 174 of energy beam 122 over the exposed powder surface in an appropriate pattern. A small portion of exposed layer of the additive powder 142 surrounding focal spot 174, referred to herein as a "weld pool" or "melt pool" or "heat effected zone" 176 (best seen in FIG. 2) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal spot 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component 170 is complete.

As explained briefly above, as energy source 120 and beam steering apparatus 124 direct energy beam 122, e.g., a laser beam or electron beam, onto the powder bed or build surface 130, the additive powders 142 are heated and begin to melt into melt pool 176 where they may fused to form the final component 170. Notably, the heated material emits electromagnetic energy in the form of visible and invisible light. A portion of the directed energy beam is reflected back into the galvanometer scanner or beam steering apparatus 124 and a portion is generally scattered in all other directions within enclosure 102. Generally speaking, monitoring the emitted and/or reflected electromagnetic energy may be used to improve process monitoring and control. An exemplary system for monitoring the additive manufacturing process, including two exemplary types of monitoring sensors, are described below according to exemplary embodiments.

Referring still to FIG. 1, a melt pool monitoring system 200 which may be used with system 100 for monitoring melt pool 176 and the manufacturing process in general will be described according to an exemplary embodiment of the present subject matter. Melt pool monitoring system 200 includes one or more electromagnetic energy sensors, e.g., such as light sensors, for measuring the amount of visible or invisible electromagnetic energy emitted from or reflected by melt pool 176. More specifically, according to the illustrated embodiment, melt pool monitoring system 200 includes two on-axis light sensors 202 and one fixed, off-axis light sensor 204. Each of these sensors 202, 204 will be described below according to an exemplary embodiment. However, it should be appreciated that melt pool monitoring system 200 may include any other suitable type, number, and configuration of sensors for detecting electromagnetic energy and other properties of melt pool 176 or the process in general.

As used herein, "beamline" or "on-axis" melt-pool sensors 202 refer to sensors which generally are positioned along the path of energy beam 122. These sensors may monitor emitted and/or reflected light returning along the beam path. Specifically, as energy beam 122 forms melt pool 176, a portion of the emitted and reflected electromagnetic energy from melt pool 176 returns to energy source 120 along the same path. An on-axis sensor 202 may include a beam splitter 206 positioned along the beamline which may include a coating for redirecting a portion of the electromagnetic energy toward a beamline sensing element 208. In this regard, for example, sensing element 208 may be a photodiode, a pyrometer, an optical camera, an infrared (IR) camera, or a spectral sensor configured for measuring electromagnetic energy in any frequency spectrum(s), such as infrared (IR), ultraviolet (UV), visible light, etc. On-axis sensor 202 can measure any suitable parameter of the filtered, reflected beam, such as intensity, frequency, wavelength, etc.

In addition, as used herein, "fixed" or "off-axis" melt-pool sensors 204 refer to sensors which generally have a fixed position relative to melt pool 176 and are used to measure electromagnetic energy generated by energy beam 122 and melt pool 176 within a specified field of view. In addition, fixed melt pool sensors 204 may include any suitable device, such as, e.g., a photodiode or infrared (IR) camera. Off-axis melt pool sensors 204 may operate in a manner similar to on-axis melt pool sensors 202, but are not located on the beamline and include a sensing element 208 that is generally configured for monitoring scattered electromagnetic energy from the melt pool 176.

According to exemplary embodiments of the present subject matter, melt pool monitoring system 200 may further include one or more filters 210 for filtering electromagnetic energy before it reaches sensing elements 208 of respective sensors 202, 204. For example, filter 210 may remove the wavelength of energy beam 122, such that sensors 202, 204 monitor only reflected electromagnetic energy. Alternatively, filters 210 may be configured for removing other unwanted wavelengths for improved monitoring of melt pool 176 or the process in general.

Melt pool monitoring system 200 further includes a controller 220 which is operably coupled with on-axis light sensor 202 and/or off-axis light sensor 204 for receiving signals corresponding to the detected electromagnetic energy. Controller 220 may be a dedicated controller for melt pool monitoring system 200 or may be system controller for operating AM system 100. Controller 220 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 220 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

As explained briefly above, conventional melt pool monitoring systems are not calibrated. Moreover, when multiple additive manufacturing machines are set up for manufacturing a series of identical parts, the melt pool monitoring systems on each of these machines may have slightly different response characteristics. Therefore, aspects of the present subject matter are directed to systems and methods of calibrating melt pool monitoring systems for additive manufacturing machines.

Figure 3:
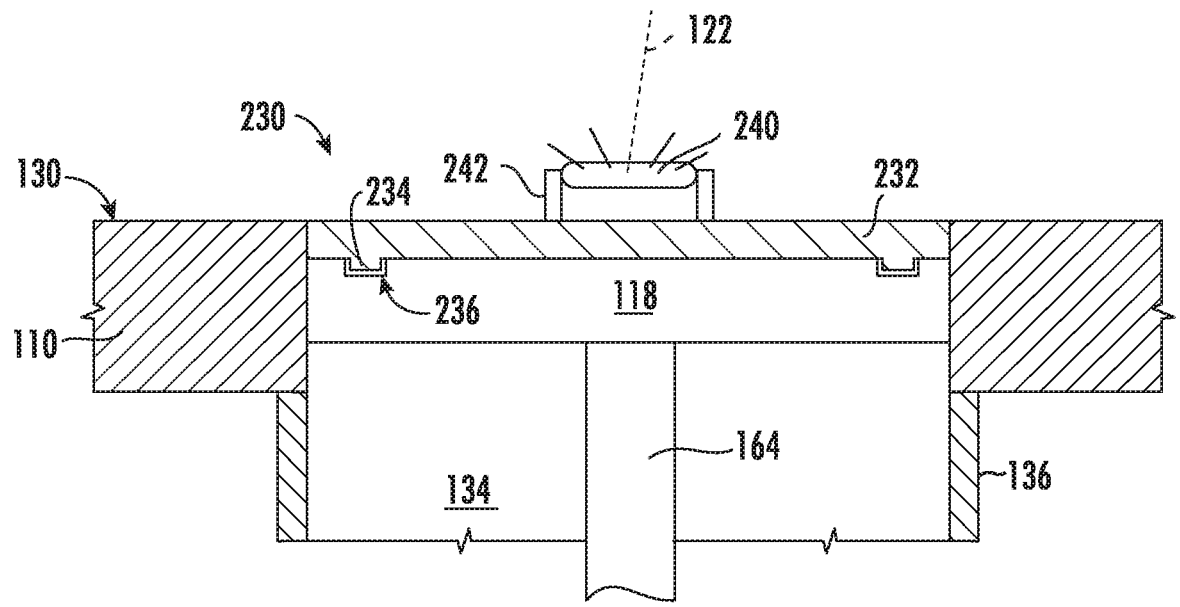
FIG. 3 shows a calibration assembly of the exemplary additive manufacturing machine of FIG. 1 according to an exemplary embodiment of the present subject matter.
Figure 4:
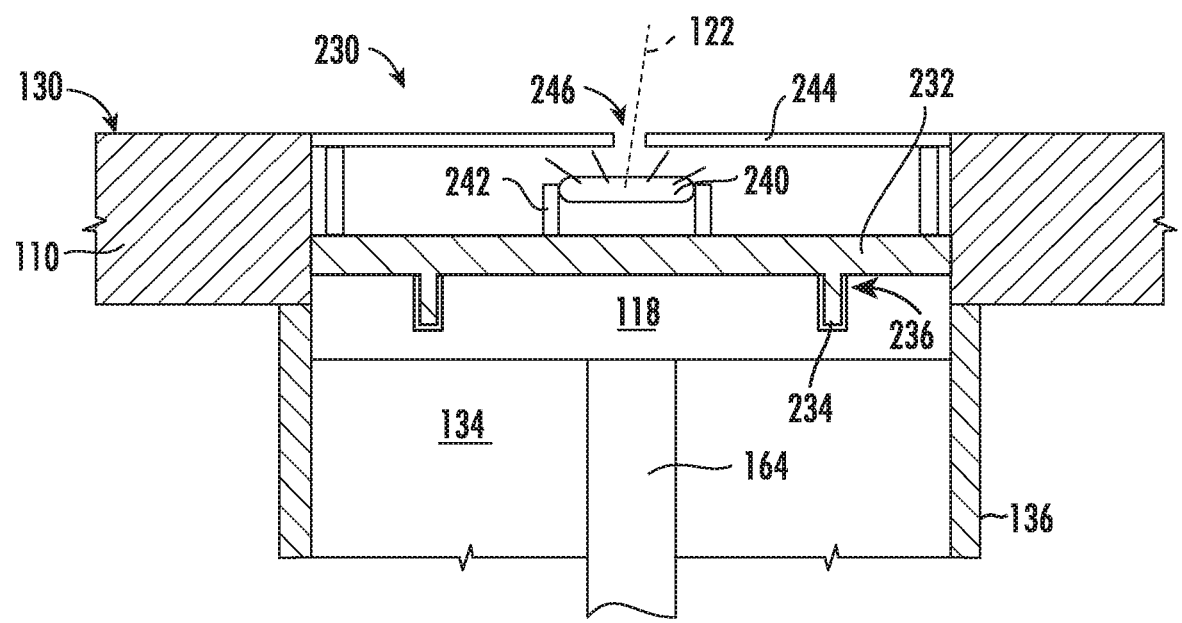
FIG. 4 shows a calibration assembly of the exemplary additive manufacturing machine of FIG. 1 according to another exemplary embodiment of the present subject matter.

Referring now specifically to FIGS. 3 and 4, a calibration system 230 which may be used to calibrate melt pool monitoring system 200 of additive manufacturing system 100 will be described according to an exemplary embodiment of the present subject matter. Although exemplary embodiments of calibration system 230 are provided herein and specifically described as being used for calibrating melt pool monitoring system 200, it should be appreciated that according to alternative embodiments, calibration system 230 may include modifications and variations, e.g., to provide more tailored calibration for a specific machine set up. The exemplary embodiments described herein and are not intended to limit the scope of the present subject matter.

As illustrated, calibration system 230 includes a calibration platform 232 which is removably mountable to build platform 118 of additive manufacturing system 100. In this regard, calibration platform 232 may be a rigid, planar mounting structure that may be mounted in any suitable additive manufacturing machine such that the position of calibration platform 232 is in a known position relative to the melt pool monitoring system 200. For example, calibration platform 232 may have the same dimensions as build platform 118 (e.g., in a horizontal plane defined by the build surface 130). In this manner, by positioning the calibration platform 232 through build opening 132, vertical walls 136 may ensure that calibration platform 232 is repeatedly positioned in a fixed, known location and orientation.

According to the exemplary embodiment, calibration platform 232 defines one or more alignment features 234 that are configured for engaging complementary features 236 defined on build platform 118 or on a build platform location of the AM machine 100. More specifically, for example, alignment features 234 may be bolts that extend down from calibration platform 232 toward build platform 118 and complementary features 236 may be holes defined in build platform 118 for receiving the bolts. Notably, each additive manufacturing machine may include an identical build platform 118 having identical complementary features 236 for receipt of alignment features 234. In this manner, build platform 118 may be moved from machine to machine by having a fixed relative position that may be known by controller 220 to achieve a precise and improved calibration process.

In addition, calibration system 230 includes one or more calibrated light sources 240 that are mounted to calibration platform 232 at a fixed, known position. Calibrated light sources 240 are generally configured for defining a measurement standard (such as a light calibration standard) when illuminated. In this regard, for example, calibrated light sources 240 may generate electromagnetic energy having a known emission intensity, wavelength mission, emission area, or any other suitable measurable quantity or quality of electromagnetic energy. It should be appreciated that as used herein, "measurement standard" may be used interchangeably to refer to the actual electromagnetic energy generated by calibrated light sources 240 or the signal generated by melt pool monitoring system 200 when measuring that electromagnetic energy.

In general, calibrated light sources 240 may be any source of electromagnetic energy, such as a light emitting diode (LED), a laser, a halogen bulb, an incandescent bulb, a glow bar, a fiber coupled light source, a black body emitter, or any other electromagnetic emission device which having a known emission intensity, wavelength mission, emission area, or any other suitable measurable quantity or quality of electromagnetic energy. The terms "light source" and "electromagnetic energy source" may be used interchangeably herein.

According to the illustrated embodiment, calibration system 230 includes a single calibrated light source 240 mounted at a center of calibration platform 232. In this regard, calibration system 230 may include a mounting structure 242 which may include one or more struts, slats, or other supports to hold calibrated light source 240 in its fixed position. Although a single calibrated light source 240 is illustrated in the exemplary embodiments, it should be appreciated that according to alternative embodiments any suitable number, type, and positioning of calibrated light sources 240 may be used to enable calibration of multiple sensors associated respectively with multiple laser system and/or to account of normal spatial variation in the sensor response due to optical system design. For example, according to another embodiment, calibration system 230 includes four calibrated light sources 240 spaced equidistant from each other on calibration platform 232 (e.g. proximate each of the four corners of calibration platform 232).

In addition, calibrated light sources 240 may be positioned at a fixed location within AM system 100 using any other suitable device or mechanism, which may be referred to herein as a light mounting mechanism. For example, according to another exemplary embodiment, one or more calibrated light sources 240 may be mounted to a retractable arm (not shown) mounted on a side of build chamber 134. In this manner, prior to a manufacturing process, the retractable arm could extend to position the light source 240 in the desired position, the calibration process could be performed, and the arm could be retracted before starting the build. Other suitable mounting structures and solutions are possible and within the scope of the present subject matter.

Referring now specifically to FIG. 4, calibration system 230 may further include a light screen 244 that is positioned over the one or more of the calibrated light sources 240. Light screen 244 may generally be any apparatus for filtering, directing, or otherwise manipulating the light generated by calibrated light sources 240. In this manner, light screen 244 may be used in conjunction with calibrated light sources 240 to define the measurement standard used to calibrate melt pool monitoring system 200. For example, according to the illustrated embodiment, light screen 244 is in a solid plate positioned over calibrated light source 240 and defines one or more apertures 246 that define a fixed emission area. In addition, calibrated light sources 240 may be selected to define a fixed emission area by any other suitable mechanism. For example, according to another exemplary embodiment the light sources 240 may be a fiber coupled light source, LED, or laser with a fixed emission area.

Notably, according to an exemplary embodiment, calibration system 230 may be movable among multiple additive manufacturing machines to provide consistent calibration values across all machines. As used herein, "calibration" may be used generally refer to the process of comparing a measured value from a sensor to a known value or calibration signal standard. In this regard, for example, calibration system 230 may generate a known "measurement standard" that may be measured by one or more light sensors, such as sensors 202, 204 of melt pool monitoring system 200. The sensor parameters may be adjusted until the output of the sensor is indicative of measured light that is substantially equivalent to the measurement standard. Alternatively, controller 220 may be configured to compensate for differences between the measured light and the measurement standard. In this manner, a relationship between a known value (the measurement standard) and an unknown value (the measured light) may be used to adjust the sensor output and reduce measurement uncertainty.

By adjusting all melt pool monitoring systems 200 in a group of additive manufacturing machines based on their response to the light generated by the calibration system 230 (i.e., the measurement standard), subsequent measurements obtained during the additive manufacturing of parts may be reliable indicators of the process and melt pool characteristics. Controller 220 may be configured for receiving, manipulating, and using this information to make necessary process corrections to achieve more precision by a single machine and more uniformity among a group of machines which have been similarly calibrated.

It should be appreciated that AM system 100, melt pool monitoring system 200, and calibration system 230 are illustrated and described herein only for explaining aspects of the present subject matter. However, the scope of the present subject matter is not limited to such exemplary embodiments, but is instead contemplated as including embodiments including variations and modifications. For example, although the actuators are illustrated herein as being a hydraulic actuators, other suitable types and configurations of actuators may be used according to alternative embodiments. In addition, other suitable forms and/or types of powder supply 112 may be used, such as a powder container that moves along build surface 130 while depositing additive powder at a predetermined flow rate. Furthermore, any suitable configuration of beam steering apparatus 124 may be used, e.g., based on the type of energy beam 122 generated. Other configurations are possible and within the scope of the present subject matter.

Now that the construction and configuration of AM system 100, melt pool monitoring system 200, and calibration system 230 have been described according to exemplary embodiments of the present subject matter, an exemplary method 300 for calibrating process monitoring system of an additive manufacturing system will be described according to an exemplary embodiment of the present subject matter. Method 300 can be used to calibrate melt pool monitoring system 200 of AM system 100, or any other suitable additive manufacturing machine. In this regard, for example, controller 220 may be configured for implementing some or all steps of method 300. Further, it should be appreciated that the exemplary method 300 is discussed herein only to describe exemplary aspects of the present subject matter, and is not intended to be limiting.

Figure 5:
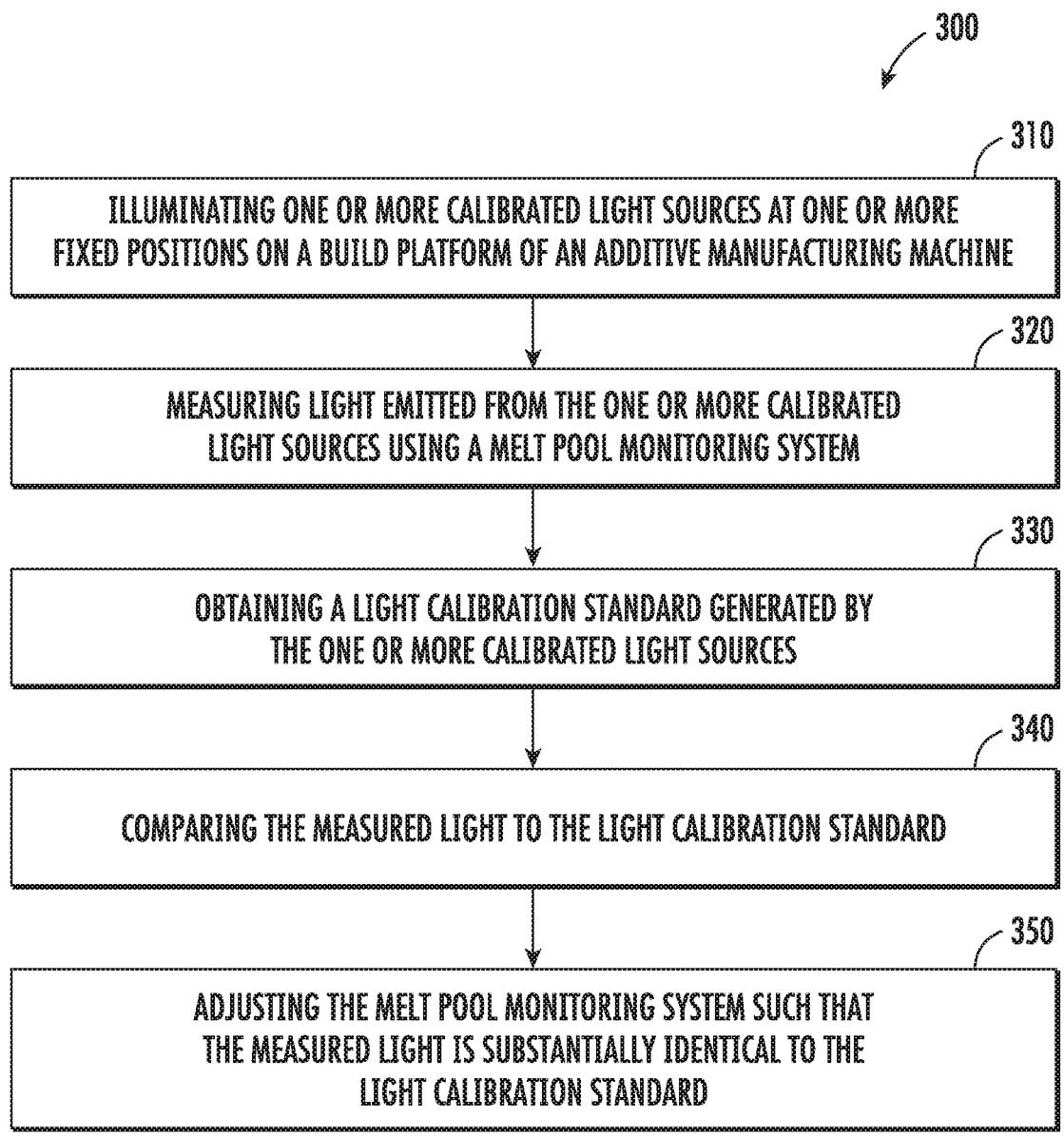
FIG. 5 is a method of calibrating an additive manufacturing machine in accordance with one embodiment of the present disclosure.

Referring now to FIG. 5, method 300 includes, at step 310, illuminating one or more calibrated light sources from one or more fixed positions on a build platform of an additive manufacturing machine. For example, continuing the example above calibration platform 232 of calibration system 230 may be mounted to build platform 118. According to an exemplary embodiment, alignment features 234 (e.g., bolts) defined by calibration platform 232 may be aligned with complementary features 236 (e.g., holes) defined in build platform 118 to ensure proper positioning and orientation of calibration platform 232 relative to build platform 118 and melt pool monitoring system 200.

Step 320 includes measuring light emitted from the one or more calibrated light sources using a melt pool monitoring system. In this regard, the one or more calibrated light sources 240 mounted on calibration platform 232 may be illuminated and the electromagnetic energy generated may be measured, e.g., by on-axis sensors 202 and/or off-axis sensors 204 of melt pool monitoring system 200. In addition, it should be appreciated that according to exemplary embodiments, fewer than all of the one or more calibrated light sources may be illuminated, and may be sequentially illuminated for generated the measurement standard.

According to an exemplary embodiment, the light may be measured by adjusting beam steering apparatus 124 of the additive manufacturing machine to one or more positions associated with each of the one or more calibrated light sources 240. In this regard, beam steering apparatus 124 may be oriented as if it were directing energy beam 122 toward each of the calibrated light sources 240 and data may be collected from melt pool monitoring system 200 when beam steering apparatus 124 is in each of the one or more positions. According to one embodiment, one or more filters may be positioned in a light path generated by the one or more calibrated light sources 240.

Step 330 includes obtaining a measurement standard generated by the one or more calibrated light sources. As explained above, the measurement standard is defined by the calibrated light sources 240 and their respective positions, emission characteristics, etc. In addition, according to exemplary embodiments, a light screen may be mounted over at least a portion of the calibration platform, the light screen defining one or more apertures. The apertures or other suitable mechanisms to define the emission area may further define the measurement standard.

Step 340 includes comparing the measured light to the measurement standard. For example, this comparison may include comparing values for one or more of light intensity, photodiode voltage response, pyrometer voltages or current response, light emission geometric dimensions, spectral response, and sensor noise response. In response to the comparison, step 350 includes adjusting the melt pool monitoring system such that a signal associated with the measured light is substantially identical to the measurement standard. In this regard, for example, this step may include adjusting one or more of a physical gain, an optical focus, a filter position, an electronic gain, or replacing a sensor.

FIG. 5 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using AM system 100, melt pool monitoring system 200, and calibration system 230 as an example, it should be appreciated that these methods may be applied to the calibration and operation of any suitable additive manufacturing machine.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of calibrating a melt pool monitoring system of an additive manufacturing machine, the method comprising:
   illuminating one or more electromagnetic energy sources from one or more fixed positions in the additive manufacturing machine;
   measuring electromagnetic energy emitted from the one or more electromagnetic energy sources using the melt pool monitoring system;
   comparing the measured electromagnetic energy to a measurement standard; and
   adjusting the melt pool monitoring system such that a signal associated with the measured electromagnetic energy is substantially identical to the measurement standard.

2. The method of claim 1, further comprising:
   positioning a light screen over the one or more electromagnetic energy sources, the light screen defining one or more apertures defining an emission area.

3. The method of claim 1, wherein the one or more electromagnetic energy sources define a fixed emission area.

4. The method of claim 1, further comprising:
   positioning the one or more electromagnetic energy sources in or on a calibration platform; and
   mounting the calibration platform in or on a build platform location of the additive manufacturing machine.

5. The method of claim 4, wherein mounting the calibration platform in or on the build platform location comprises:
   aligning one or more alignment features defined on the calibration platform with complementary features defined on the build platform location of the additive manufacturing machine.

6. The method of claim 1, further comprising:
   obtaining the measurement standard generated by the one or more electromagnetic energy sources.

7. The method of claim 1, further comprising:
   illuminating fewer than all of the one or more electromagnetic energy sources.

8. The method of claim 1, wherein comparing the measured electromagnetic energy to the measurement standard comprises comparing values for one or more of light intensity, photodiode voltage response, pyrometer voltages or current response, light emission geometric dimensions, spectral response, and sensor noise response.

9. The method of claim 1, further comprising:
   adjusting a beam steering apparatus of the additive manufacturing machine to one or more positions associated with each of the one or more electromagnetic energy sources; and
   collecting data from an on-axis light sensor in the melt pool monitoring system when the beam steering apparatus is in each of the one or more positions.

10. The method of claim 1, wherein adjusting the melt pool monitoring system such that the measured electromagnetic energy is substantially identical to the measurement standard comprises adjusting one or more of a physical gain, an optical focus, a filter position, an electronic gain, or replacing a sensor.

11. A calibration system for a melt pool monitoring system of an additive manufacturing machine, the calibration system comprising:
   a light mounting mechanism positionable at desired locations within the additive manufacturing machine; and
   one or more electromagnetic energy sources mounted to the light mounting mechanism, the one or more electromagnetic energy sources defining a measurement standard when illuminated; wherein the light mounting mechanism comprises:
   a calibration platform removably mountable to a build platform of the additive manufacturing machine; or a retractable arm mounted on a side of a build chamber, wherein the retractable arm is extended prior to a manufacturing process and retracted before starting a build.

12. The calibration system of claim 11, wherein the calibration platform defines one or more alignment features that are configured for engaging complementary features defined on the build platform.

13. The calibration system of claim 11, wherein the one or more electromagnetic energy sources are selected from a group consisting of a light emitting diode (LED), a laser, a halogen bulb, an incandescent bulb, a glow bar, a fiber coupled light source, and a black body emitter.

14. The calibration system of claim 11, wherein the one or more electromagnetic energy sources has a known emission intensity, spectral signature, or emission area.

15. The calibration system of claim 11, wherein the melt pool monitoring system comprises:

an on-axis light sensor positioned along a light path of the electromagnetic energy generated by the electromagnetic energy sources when illuminated.

16. The calibration system of claim 15, wherein the on-axis light sensor comprises at least one of a photodiode, a pyrometer, a camera, and a spectral sensor.

17. The calibration system of claim 11, wherein the melt pool monitoring system comprises:

an off-axis light sensor positioned at a fixed location within the additive manufacturing machine.

18. The calibration system of claim 11, comprising:

a light screen positioned over the one or more electromagnetic energy sources, the light screen defining one or more apertures defining an emission area.

19. The calibration system of claim 11, comprising:

one or more filters positioned in a light path generated by the one or more electromagnetic energy sources.

* * * * *